(12) United States Patent
Jang

(10) Patent No.: US 9,236,618 B2
(45) Date of Patent: Jan. 12, 2016

(54) RECHARGEABLE BATTERY

(75) Inventor: Youngcheol Jang, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 1145 days.

(21) Appl. No.: 12/249,458

(22) Filed: Oct. 10, 2008

(65) Prior Publication Data

US 2009/0123816 A1 May 14, 2009

(30) Foreign Application Priority Data

Nov. 13, 2007 (KR) .................. 10-2007-0115310

(51) Int. Cl.
| | |
|---|---|
| *H01M 10/00* | (2006.01) |
| *H01M 6/50* | (2006.01) |
| *H01M 2/02* | (2006.01) |
| *H01M 2/10* | (2006.01) |
| *H01M 10/42* | (2006.01) |

(52) U.S. Cl.
CPC ............ *H01M 6/5044* (2013.01); *H01M 2/021* (2013.01); *H01M 2/0202* (2013.01); *H01M 2/1022* (2013.01); *H01M 6/505* (2013.01); *H01M 6/5072* (2013.01); *H01M 10/4257* (2013.01); *H01M 2/0275* (2013.01)

(58) Field of Classification Search
None
See application file for complete search history.

(56) References Cited

FOREIGN PATENT DOCUMENTS

| | | |
|---|---|---|
| JP | 10-090244 | 4/1998 |
| JP | 11-144695 | 5/1999 |
| JP | 2000-090896 | 3/2000 |
| JP | 2001351594 | 12/2001 |
| JP | 2005-055703 | 3/2005 |
| JP | 2005-135771 | 5/2005 |
| JP | 2005-189117 | 7/2005 |
| JP | 2005-208342 | 8/2005 |
| JP | 2006-011050 | 1/2006 |
| KR | 10-2003-0071264 | 9/2003 |
| KR | 10-2005-0089175 | 9/2005 |
| KR | 10-0719731 | 5/2007 |
| KR | 10-0770108 | 10/2007 |

OTHER PUBLICATIONS

Machine translation of JP-2000-090896.*
English-language Abstract of KR 10-2007-0071253.

* cited by examiner

*Primary Examiner* — Krishnan S Menon
(74) *Attorney, Agent, or Firm* — Knobbe Martens Olson & Bear LLP

(57) ABSTRACT

A rechargeable battery, and more particularly, a rechargeable battery having a function of detecting water contact. The area for detecting water contact is formed on the rechargeable battery or its component parts by applying water-soluble ink on a surface thereof. It is straightforward to form such a rechargeable battery and to easily determine whether the rechargeable battery or its component parts have been in contact with water.

6 Claims, 14 Drawing Sheets

RECHARGEABLE BATTERY

CROSS-REFERENCE TO RELATED APPLICATIONS

This application claims the benefit of Korean Patent Application No. 2007-115310, filed Nov. 13, 2007 in the Korean Intellectual Property Office, the entire disclosure of which is incorporated herein by reference.

BACKGROUND OF THE INVENTION

1. Field of the Invention

Aspects of the present invention relate to a rechargeable battery, and more particularly, to a rechargeable battery having the function of detecting water contact.

2. Description of the Related Art

Portable electrical/electronic devices that are compact and light, such as cellular phones, notebook computers, camcorders and the like, have been developed and are currently produced. Battery packs are embedded in such portable electrical/electronic devices, so that the portable electrical/electronic devices can operate in places where a separate power source is not provided. For economy, battery packs generally use rechargeable batteries. Representative examples of rechargeable batteries are nickel-cadmium (Ni—Cd) batteries, nickel-metal hydride (Ni-MH) batteries, lithium (Li) batteries, lithium-ion (Li-ion) rechargeable batteries and the like. In particular, lithium-ion (Li-ion) rechargeable batteries have an operating voltage three times higher than nickel-cadmium (Ni—Cd) batteries or nickel-metal hydride (Ni-MH) batteries, which are widely used as a power source of portable electronic devices. Lithium-ion (Li-ion) rechargeable batteries are also widely used since their energy density per unit weight is higher than those for the other batteries.

Lithium-ion (Li-ion) rechargeable batteries generally use lithium-based oxides as positive electrode active materials and carbon materials as negative electrode active materials. Batteries are generally classified into liquid electrolyte batteries and polymer electrolyte batteries according to the type of electrolyte. Lithium-ion (Li-ion) rechargeable batteries use a liquid electrolyte, and lithium polymer batteries use a polymer electrolyte. Lithium-ion (Li-ion) rechargeable batteries are manufactured into various types of shapes. Representative examples thereof are cylinder type lithium-ion (Li-ion) rechargeable batteries, prismatic type lithium-ion (Li-ion) rechargeable batteries, and pouch type lithium-ion (Li-ion) rechargeable batteries.

Rechargeable batteries having the above shapes in a bare cell state are incorporated into a battery pack that also includes protective circuit modules, exterior finishing materials and the like. Protective circuit modules control charging/discharging when rechargeable batteries are charged/discharged, and block current flow from charging/discharging when the rechargeable batteries are over-heated or over-charged.

Devices such as labels for detecting water contact are separately attached to battery packs and detect whether the battery packs contact water. However, labels for detecting water contact need to be separately, often manually attached to the battery packs, which reduces the efficiency of producing finished battery packs.

SUMMARY OF THE INVENTION

An aspect of the present invention improves the production efficiency for rechargeable batteries by applying water-soluble ink directly to the surface of the circuit board during the manufacturing process. Another aspect of the present invention provides a method of efficiently improving detection of water contact in a rechargeable battery.

Another aspect of the present invention provides a rechargeable battery including a circuit board; a battery electrically coupled with the circuit board; and, a cover case coupled to at least one of the circuit board and the battery, wherein an area for detecting water contact is formed on at least one of the circuit board, the battery and the cover case. The area for detecting water contact may be formed by applying a water-soluble ink on at least one of the circuit board, the battery and, the cover case. Also, areas for detecting water contact may be formed on the circuit board by applying a water-soluble ink at a plurality of sites.

The circuit board includes an insulating substrate, at least one printed circuit pattern formed on the insulating substrate, and protective circuit parts electrically connected to the printed circuit pattern, wherein the area for detecting water contact may be formed on at least one of the insulating substrate, the printed circuit pattern, and the protective circuit parts. Paint may be applied on a top surface of at least one of the insulating substrate, the printed circuit pattern, and the protective circuit parts, and the area for detecting water contact having a different color from that of the paint is formed on a top surface of the paint.

The circuit board also includes an insulating substrate, at least one printed circuit pattern formed on the insulating substrate, and protective circuit parts electrically connected to the printed circuit pattern, wherein at least one hole may be formed in the insulating substrate, and the area for detecting water contact is formed by applying water-soluble ink in the hole. Also, the circuit board includes an insulating substrate, at least one printed circuit pattern formed on the insulating substrate, and protective circuit parts electrically connected to the printed circuit pattern, wherein at least one groove may be formed in the insulating substrate, and the area for detecting water contact is formed by applying water-soluble ink in the groove.

A hole may also be formed in the cover case and the area for detecting water contact is externally exposed via the hole. Also, the circuit board may include an examination terminal, in which case a hole for exposing the examination terminal may be formed in the cover case, and the area for detecting water contact is exposed via the hole. Also, the area for detecting water contact may be formed on at least one of an inner surface and an outer surface of the cover case by applying a water-soluble ink. Also, at least one hole may be formed in the cover case and the area for detecting water contact formed by applying a water-soluble ink in the hole.

At least one groove may also be formed in the cover case and the area for detecting water contact is formed in the groove by applying a water-soluble ink in the groove. In this case, the groove may be formed in a linear shape and the area for detecting water contact is formed in the groove by applying a water-soluble ink in the groove. The groove may also be formed in a plurality of grooves, at least one groove having a different depth, and the areas for detecting water contact are formed in the grooves by applying a water-soluble ink in the groove.

The rechargeable battery may further include a combination auxiliary where the combination auxiliary is formed between the battery and the cover case, and the area for detecting water contact may then be formed in a groove in the combination auxiliary by applying water-soluble ink in the combination auxiliary groove. In this case, the combination auxiliary is one of a lead tap electrically connecting the battery and the circuit board, an insulator insulating the lead tap and the positive electrode and the negative electrode of the battery, a receiving case formed between the battery and the cover case, a label surrounding at least a part of the battery, and a reinforcing plate surrounding at least a part of the battery.

The battery also includes an electrode assembly having a positive electrode and a negative electrode, a can containing the electrode assembly, and a material for closing the electrical connection connected to the positive electrode and the negative electrode of the electrode assembly, wherein the area for detecting water contact may be formed on at least one of the can and the material for completing the electrical connection by applying a water-soluble ink to at least one of the can or the material. Also, the battery may include an electrode assembly and a pouch containing the electrode assembly, wherein the area for detecting water contact may be formed on the pouch by applying a water-soluble ink to at least one of the electrode assembly and the pouch.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
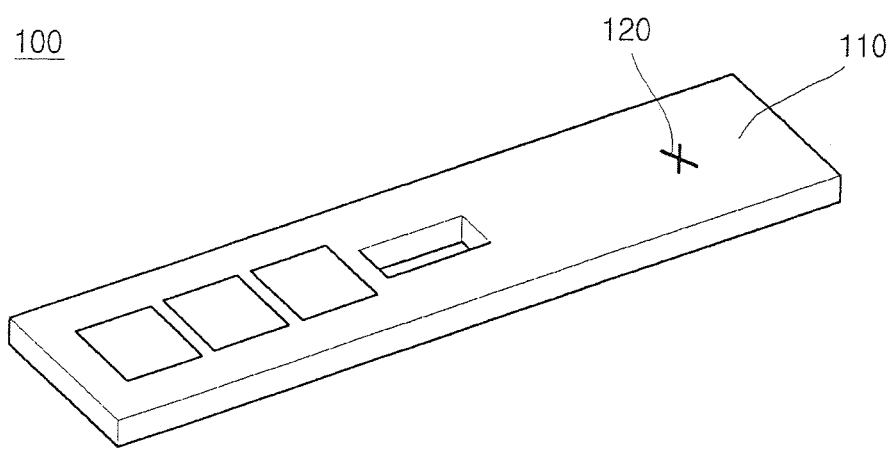
FIG. 1A is a perspective view illustrating a circuit board having the function of detecting water contact according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1A is a perspective view illustrating a circuit board 100 having the function of detecting water contact according to an embodiment of the present invention. An area for detecting water contact using water-soluble ink 120 is formed on an insulating substrate 110.

The circuit board 100 includes a printed circuit pattern (not shown) formed on an insulating substrate (110) and may include an electric element (not shown) that is solder-coupled with the printed circuit pattern (not shown). However, the present invention is not limited to the constituents of the circuit board 100 or the connections therebetween. Therefore, the circuit board 100 may be any circuit board used in an electronic product.

The water-soluble ink 120 may be formed by using printing ink that spreads when the ink contacts water or a material equivalent to such ink, or using an equivalent method, but the present invention is not limited thereto. The water-soluble ink 120 that is used to form an area for detecting water contact remains in a specific shape and pattern when not contacting water, and is diluted by water and changes its shape and pattern, i.e., spreads into the water. In other words, the circuit board 100 having the function of detecting water contact can detect whether it contacts water because of the water-soluble ink 120 applied on the surface of the circuit board 100. Therefore, when a portable electronic product, a battery, or the like using the circuit board 100 having the function of detecting water contact contacts water, it is possible to detect whether there has been water contact by visually checking the water-soluble ink 120.

Figure 1B:
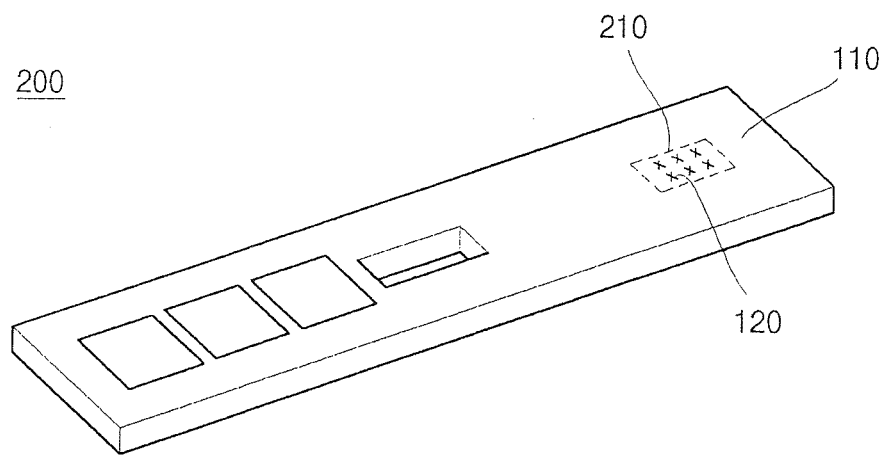
FIG. 1B is a perspective view illustrating a circuit board having the function of detecting water contact according to another embodiment of the present invention.

FIG. 1B is a perspective view illustrating a circuit board 200 having the function of detecting water contact according to another embodiment of the present invention. Water-soluble ink 120 may be applied on an insulating substrate 110 in a plurality of marks to form an area 210 for detecting water contact. The area 210 for detecting water contact may be formed in a plurality of 'x'-shaped identification marks, as shown in FIG. 1B, to visibly show well whether there has been water contact. The area 210 for detecting water contact may instead be formed in '+'-shaped identification marks or in a plurality of dotted-type identification marks and the like, which are different from the marks of FIG. 1B. However, the present invention is not limited to the shape of the area 210 for detecting water contact.

Figure 1C:
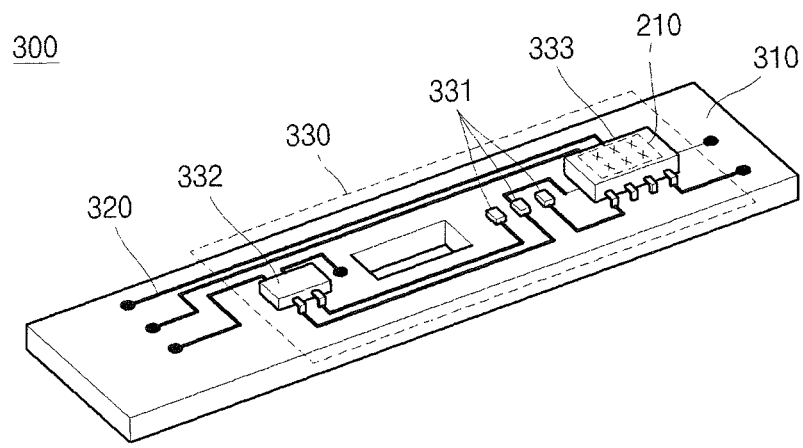
FIG. 1C is a perspective view illustrating a circuit board having the function of detecting water contact according to still another embodiment of the present invention.

FIG. 1C is a perspective view illustrating a circuit board 300 having the function of detecting water contact according to still another embodiment of the present invention. The circuit board 300 may include an insulating substrate 310, a printed circuit pattern 320 formed on the insulating substrate 310, and an electric element 330 coupled with the printed circuit pattern 320. An area 210 for detecting water contact may be applied on at least one portion of the surface of the printed circuit pattern 320 or the electric element 330.

The insulating substrate 310 may be formed of phenol-formaldehyde-based resin or epoxy-based resin. However, the present invention is not limited thereto. Although not shown in FIG. 1C, the area 210 for detecting water contact may be applied even on the insulating substrate 310.

The printed circuit pattern 320 may be formed in a conductive thin film, such as a copper foil and the like, and then integrally formed with the insulating substrate 310. Although not shown in FIG. 1C, the area 210 for detecting water contact may be applied even on the printed circuit pattern 320.

The electric element 330 may be solder coupled with the printed circuit pattern 320. The electric element 330 may include a passive element 331, an active element 332, or an integrated circuit 333. The passive element 331 may be an element such as a condenser, a resistance or coil, and the like. The active element 332 may be an element such as a diode and a transistor. The integrated circuit 333 may be a semiconductor package in which a semiconductor chip embedded with an integrated circuit is packaged. It is possible to detect whether each portion of the insulating substrate 310 contacts water by selectively forming the area 210 for detecting water contact on the specific surface of the electric elements 330. As an example of the area 210 for detecting water contact formed on the electric element 330, the area 210 for detecting water contact is formed on one surface of the semiconductor chip 333 as shown in FIG. 1C.

Figure 1D:
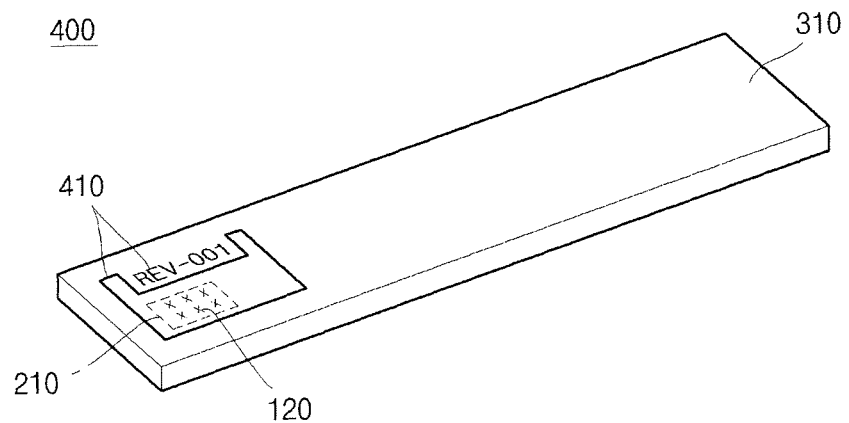
FIG. 1D is a perspective view illustrating a circuit board having the function of detecting water contact according to still another embodiment of the present invention.

FIG. 1D is a perspective view illustrating a circuit board 400 having the function of detecting water contact according to still another embodiment of the present invention. Paint 410 is applied on a top surface of an insulating substrate 310 formed on the circuit board 400, and water-soluble ink 120 having a different color from that of the paint 410 is applied on the top surface of the paint 410, thereby forming an area 210 for detecting water contact. The paint 410 may be applied on the top surface of a printed circuit pattern (not shown). The paint 410 may represent a produced date, a serial number, and the like, applied on one surface of the insulating substrate 310 using intaglio printing or embossing, and may for example be in white. It is possible to apply the area 210 for detecting water contact, which for example may be purple, red, or the like, on the white paint 420. Therefore, it is possible to make it visually clear whether the area 210 for detecting water contact has changed by using the difference in color between the paint 410 and the area 210 for detecting water contact. However, the present invention is not limited to the colors of the paint 410 and the area 210 for detecting water contact. Although not shown in FIG. 1D, the paint 410 may also be applied on a top surface of an electric element, and the area 210 for detecting water contact may be formed on the paint 410.

Figure 1E:
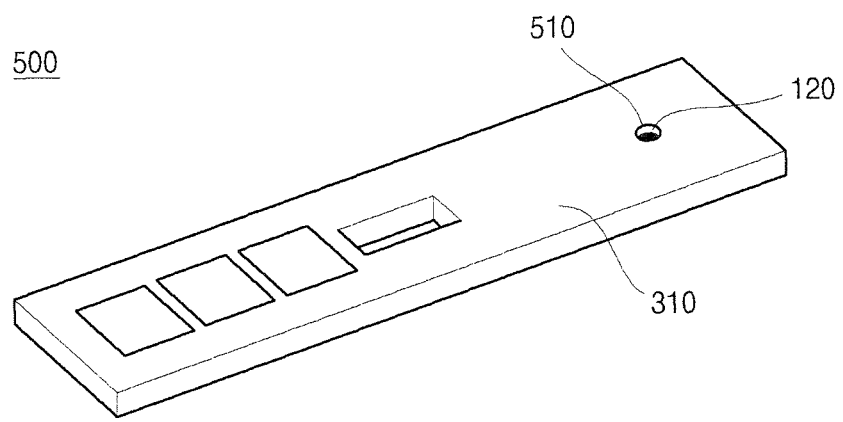
FIG. 1E is a perspective view illustrating a circuit board having the function of detecting water contact according to still another embodiment of the present invention.

FIG. 1E is a perspective view illustrating a circuit board 500 having the function of detecting water contact according to still another embodiment of the present invention. One or more holes 510 may be formed in an insulating substrate 310 of the circuit board 500, and water-soluble ink 120 may be applied in the hole 510.

If the circuit board 500 contacts water, the water-soluble ink 120 applied in the hole 510 is diluted in the water and then sinks through the holes 510. Therefore, if the water-soluble ink 120 applied in the hole 510 of the circuit board 500 is examined, it is possible to detect whether there has been water contact based on whether the water-soluble ink 120 has spread through hole 510 or changed its pattern. Hole 510 may be formed in the center of the insulating substrate 310 so that it is easy to detect whether there has been water contact.

Figure 1F:
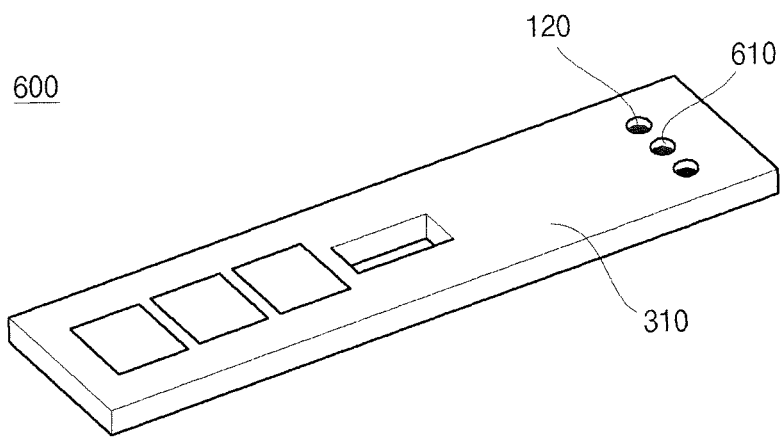
FIG. 1F is a perspective view illustrating a circuit board having the function of detecting water contact according to still another embodiment of the present invention.

FIG. 1F is a perspective view illustrating a circuit board 600 having the function of detecting water contact according to still another embodiment of the present invention. One or more grooves 610 may be formed in an insulating substrate 310 of the circuit board 600, and water-soluble ink 120 may be applied in the grooves 610. The grooves 610 may stay in water when the circuit board 600 contacts water. Therefore, water-soluble ink 120 is changed into a liquid state (dissolved or suspended) and drains out of the grooves 610 when the insulating substrate 310 moves, thereby showing whether there has been water contact.

Figure 2A:
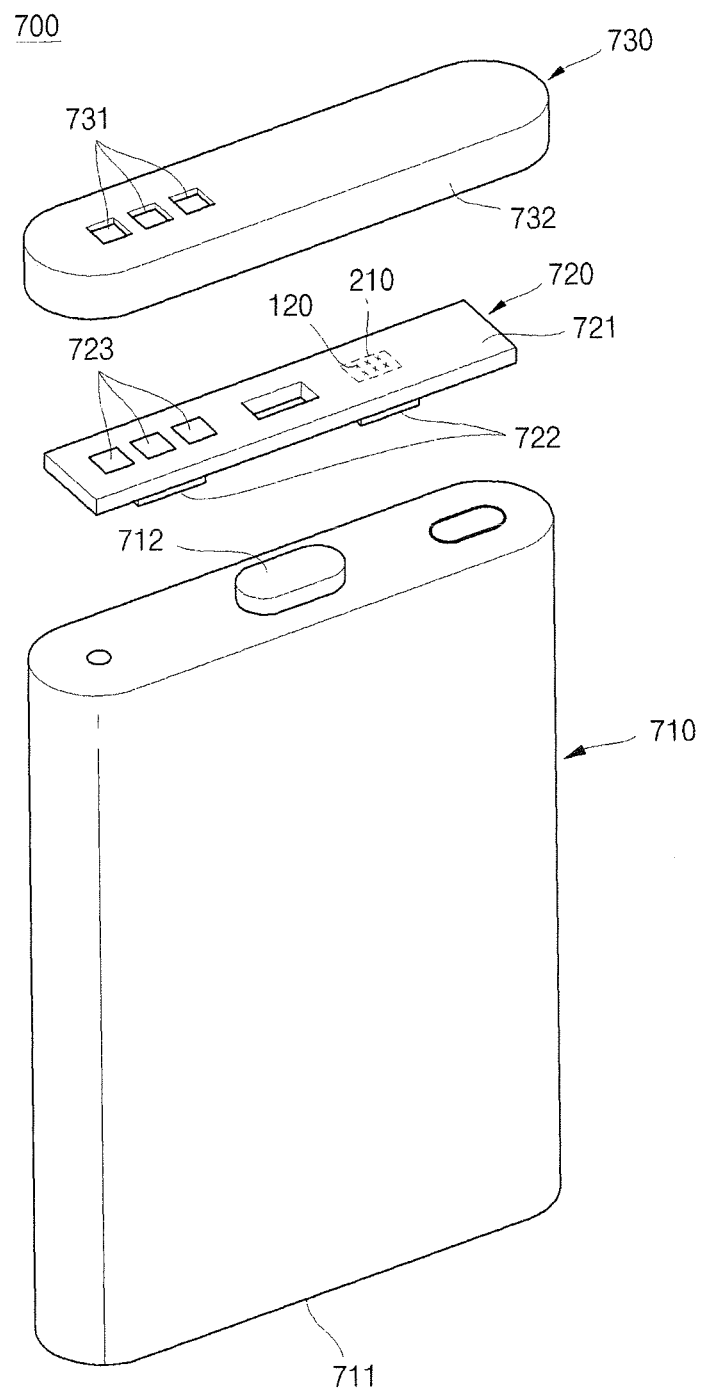
FIG. 2A is an exploded perspective view illustrating a rechargeable battery having the function of detecting water contact according to still another embodiment of the present invention.
Figure 2B:
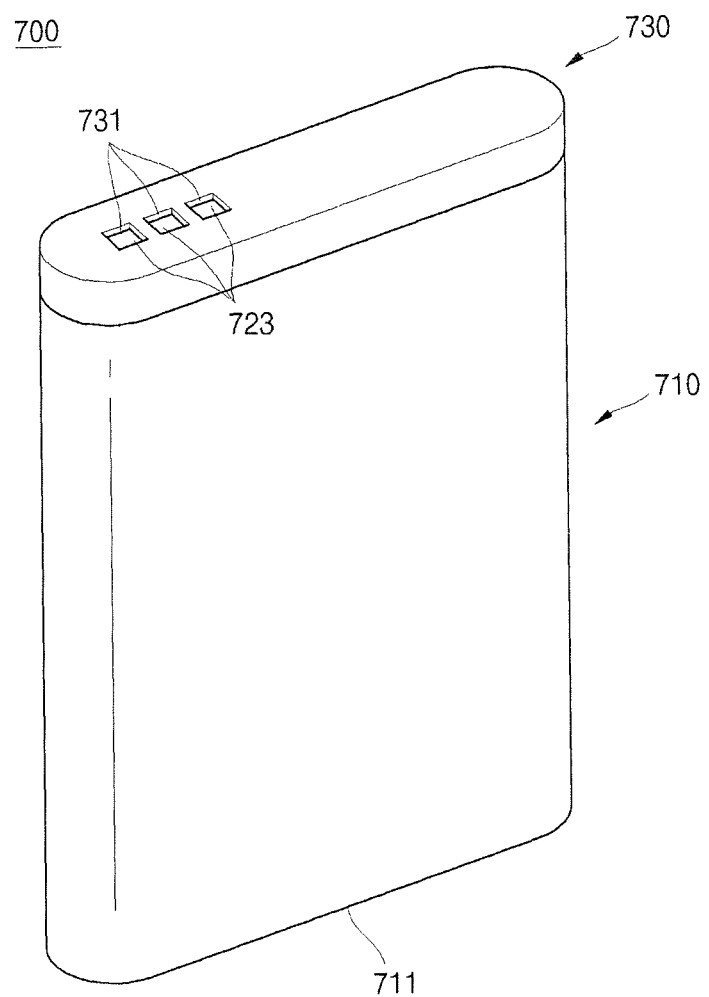
FIG. 2B is a perspective view illustrating the assembled rechargeable battery of FIG. 2A.

FIG. 2A is an exploded perspective view illustrating a rechargeable battery 700 having the function of detecting water contact according to still another embodiment of the present invention. FIG. 2B is a perspective view illustrating the assembled rechargeable battery 700 of FIG. 2A. The rechargeable battery 700 may include a battery 710, a circuit board 720, and a cover case 730. Circuit board 720 includes an insulating substrate 721, a printed circuit pattern (not shown), and protective circuit parts 722.

The battery 710 includes a positive electrode 711 and a negative electrode 712. The battery 710 may be formed of one or more batteries. The battery 710 may be a can type battery containing an electrode assembly in a metal can. Alternatively, the battery 710 may be a pouch type battery containing the electrode assembly in a pouch. However, the present invention is not limited to the type of the battery 710 used in the rechargeable battery 700.

The circuit board 720 may include protective circuit parts 722 that are electrically connected to the positive electrode 711 and the negative electrode 712 of the battery 710 and perform a protective function when the battery 710 is charged/discharged, the printed circuit pattern (not shown) to which the protection circuit parts 722 are soldered, and the insulating substrate 721 that receives the printed circuit pattern (not shown). The positive electrode 711 and the negative electrode 712 of the battery 710 may be electrically connected to the circuit board 720 using a wire (not shown) or a lead tap (not shown), but the present invention is not limited to the particular electrical connections of the positive electrode 711 and the negative electrode 712 of the battery 710 to the circuit board 720. Meanwhile, the protective circuit parts 722 may include a passive element (not shown), an active element (not shown), and an integrated circuit (not shown). When charging/discharging terminals 723 are connected to a charger and start charging, or when they are connected to loads and start discharging, the protective circuit parts 722 may turn on or off a charging/discharging field-effect transistor (FET) (not shown) by using a control integrated circuit (IC) that is a direct circuit, and selectively charge or discharge the battery 710. The charging/discharging FET may be separated into a charging FET and a discharging FET and establish separate charging and discharging paths to the battery 710. The protective circuit parts 722 may include a safety element, such as a Positive Temperature Coefficient (PTC), a thermal breaker, and the like to detect overheating and overcharge states of the battery 710 that is being charged/discharged and stop the charging/discharging of battery 710. The protective circuit parts 722 may be electrically connected to the charging/discharging paths of the battery 710 to detect a charging/discharging current of the battery 710 and detect the over-charge state. The protective circuit parts 722 may be soldered on the printed circuit pattern (not shown) formed on the insulating substrate 721 to form a structurally stabilized integral type board. The protective circuit parts 722 having the above-described function perform the protection function for the circuit board 720.

Meanwhile, the water-soluble ink 120 may be applied on at least one portion of the surface of the circuit board 720 to form an area 210 for detecting water contact. As described above in the aforementioned embodiments, the area 210 for detecting water contact may be applied on one surface of the insulating substrate 721 and the printed circuit pattern (not shown). The water-soluble ink 120 may also be applied on a top surface of paint (not shown), which is applied on a top surface of the insulating substrate 721. The protective circuit parts 722 may be formed by using electric elements of the aforementioned embodiments. The water-soluble ink 120 may be selectively applied on the protective circuit parts 722. That is, when the area 210 for detecting water contact is applied on the surface of a control IC that is an integrated circuit, or a passive element such as a condenser, and when the circuit board 720 contacts water, it is possible to determine whether the protective circuit parts 722 contact water by observing any change in the area 210 for detecting water contact. The area 210 for detecting water contact applied on the insulating substrate 721 is the same as described in previous embodiments, and thus its detailed description is not repeated.

The cover case 730 may be combined with at least one of the printed circuit board 720 and the battery 710 to insulate the circuit board 720 and protect the circuit board 720 from an external shock. The cover case 730 may have charging/discharging terminal holes 731 that expose a terminal surface of the charging/discharging terminals 723 formed on the printed circuit board 720. The cover case 730 may include a sidewall 732 to cover a side surface of the circuit board 720. The sidewall 732 may contact one surface of the battery 710 so that an outer surface of the battery 710 may correspond to that of the sidewall 732. The cover case 730 may be formed by injection-molding a thermoplastic resin material. Although not shown in FIG. 2A, the cover case 730 may include a frame (not shown) that surrounds the circuit board 720 and the battery 710. However, the present invention is not limited to the material and shape of the cover case 730.

When the rechargeable battery 700 contacts water, it is possible to determine whether the circuit board 720 contacts water immediately after opening the cover case 730 covering the circuit board 720. In more detail, by observing a change in the area 210 for detecting water contact caused when the rechargeable battery 700 is contacting water due to a user's carelessness or mistake, it is possible to dry the moisture from the circuit board 720, prevent a short circuit, and then inspect the circuit board 720 when the operating state of the circuit board 720 is examined.

Figure 2C:
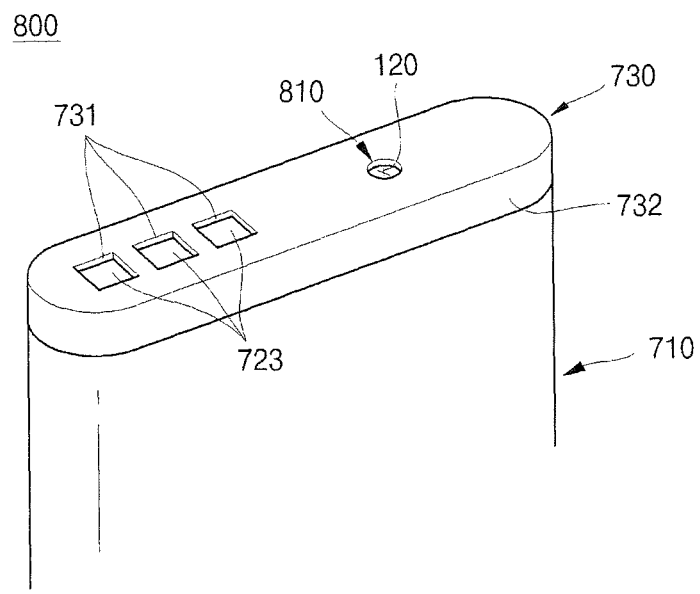
FIG. 2C is a partial perspective view illustrating a rechargeable battery according to still another embodiment of the present invention.

FIG. 2C is a partial perspective view illustrating a rechargeable battery 800 having the function of detecting water contact according to an embodiment of the present invention. The rechargeable battery 800 may further include a hole 810 different from charging/discharging terminal holes 731 in cover case 730. Water-soluble ink 120 may be exposed through the hole 810. Since the hole 810 is formed to face the water-soluble ink 120 applied on a circuit board (not shown), the hole 810 may be formed in any portion of the cover case 730. It is possible to determine whether the rechargeable battery 800 contacts water by observing any change in the pattern of the water-soluble ink 120 of the circuit board via the hole 810. Therefore, it is possible to determine whether the rechargeable battery 800 contacts water without disassembling the cover case 730.

Figure 2D:
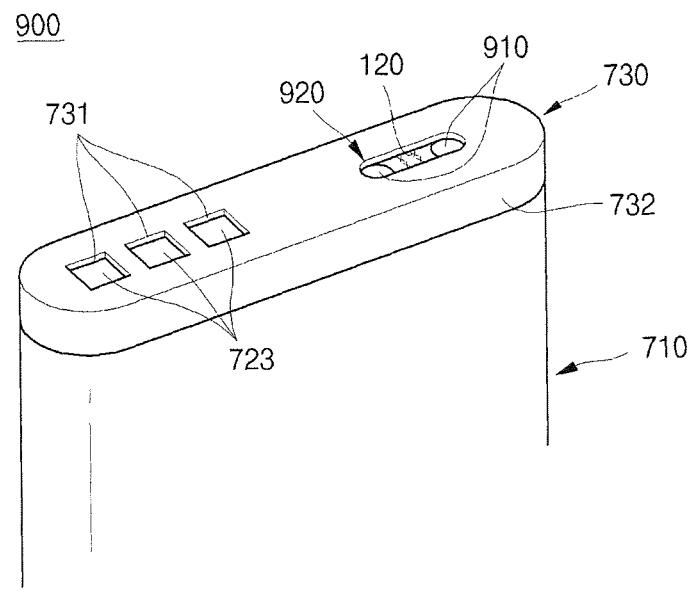
FIG. 2D is a partial perspective view illustrating a rechargeable battery having the function of detecting water contact according to still another embodiment of the present invention.

FIG. 2D is a partial perspective view illustrating a rechargeable battery 900 having the function of detecting water contact according to still another embodiment of the present invention. The rechargeable battery 900 may further include an examination terminal 910 that is electrically connected to a printed circuit pattern (not shown) formed on a circuit board (not shown), and a hole 920 other than charging/discharging terminal holes 731 in a cover case 730 that exposes the examination terminal 910.

The examination terminal 910 is also used as an electrical connection part when to determine whether a protective circuit part (not shown) formed on the circuit board operates; that is, the examination terminal 910 is electrically connected to the printed circuit pattern. Water-soluble ink 120 is applied around the examination terminal 910. Accordingly, one can view the water-soluble ink 120 through the hole 920 that exposes the examination terminal 910. Therefore, it is possible to determine through hole 920 whether there has been a change in the water-soluble ink 120 pattern, and then, if the circuit board has not contacted water, examine whether through the examination terminal 910 whether an error has occurred in the protective circuit part. When it has been determined that the water-soluble ink 120 pattern has changed, it is then possible to examine through the examination terminal 910 whether the error occurred in the protective circuit part after drying the circuit board.

Figure 2E:
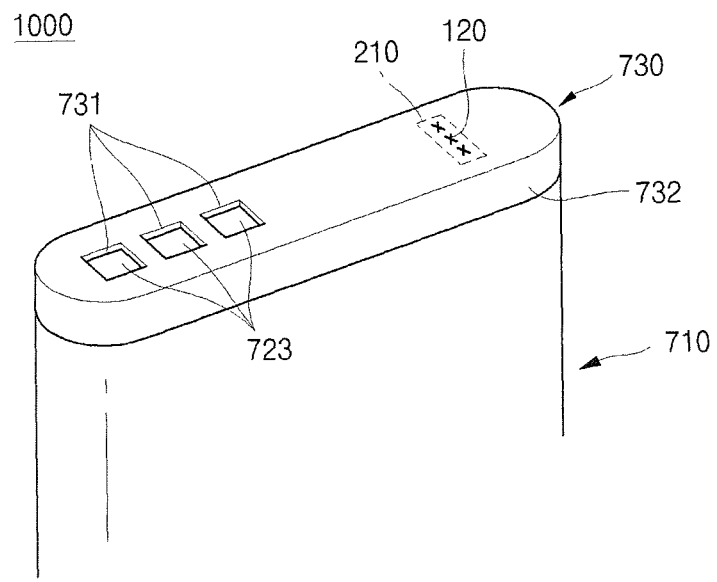
FIG. 2E is a partial perspective view illustrating a rechargeable battery having the function of detecting water contact according to still another embodiment of the present invention.

FIG. 2E is a partial perspective view illustrating a rechargeable battery 1000 having the function of detecting water contact according to still another embodiment of the present invention. Water-soluble ink 120 may be applied on an outer surface of cover case 730 of the rechargeable battery 1000 to form an area 210 for detecting water contact. Although not shown in FIG. 2E, the water-soluble ink 120 may also be applied on an inner surface of the cover case 730 to form the area 210 for detecting water contact. Accordingly, it is possible to determine immediately whether the rechargeable battery 1000 contacts water when the water-soluble ink 120 is applied on the outer surface of the cover case 730. Meanwhile, it is also possible to determine whether the inner surface of the cover case 730 of the rechargeable battery 1000 contacts water when the water-soluble ink 120 is applied on the inner surface of the cover case 730.

Figure 2F:
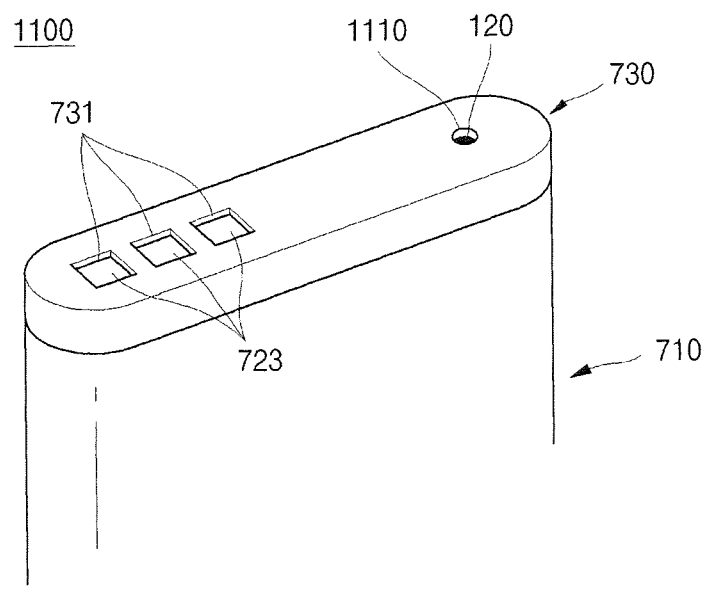
FIG. 2F is a partial perspective view illustrating a rechargeable battery having the function of detecting water contact according to still another embodiment of the present invention.

FIG. 2F is a partial perspective view illustrating an assembled battery pack 1100 having the function of detecting water contact according to still another embodiment of the present invention. The rechargeable battery 1100 may further include one or more holes 1110 different from charging/discharging terminal holes 731 in the cover case 730. Water-soluble ink 120 may be applied in the holes 1110.

If the rechargeable battery 1100 contacts water, the water-soluble ink 120 applied in the holes 1110 is diluted in water, and then sinks through the holes 1110. Therefore, if the water-soluble ink 120 applied in the holes 1110 of the rechargeable battery 1100 is examined, it is possible to immediately detect whether there has been water contact based on whether the water-soluble ink 120 has spread through holes 1110 or changed its pattern. Holes 1110 may also be formed as more than one in the cover case 730 so that it is easy to detect whether there has been water contact.

Figure 2G:
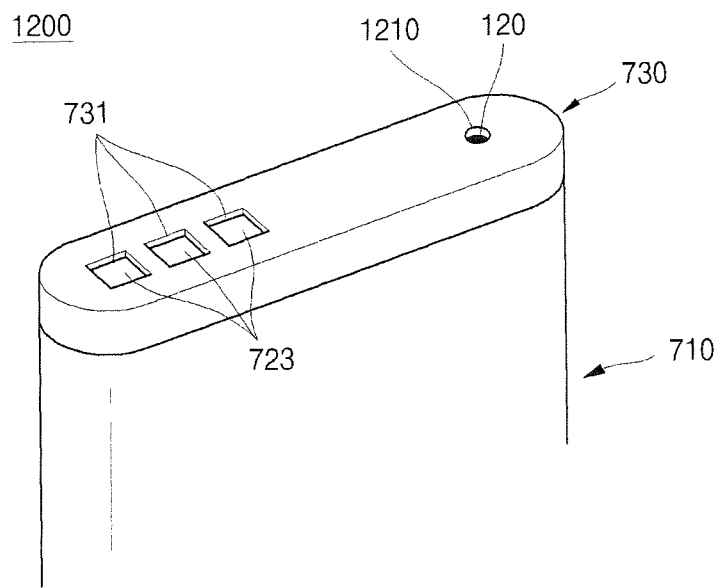
FIG. 2G is a partial perspective view illustrating a rechargeable battery having the function of detecting water contact according to still another embodiment of the present invention.

FIG. 2G is a partial perspective view illustrating a rechargeable battery 1200 having the function of detecting water contact according to another embodiment of the present invention. One or more grooves 1210 may be formed in the cover case 730 of the rechargeable battery 1200, and water-soluble ink 120 may be applied in the grooves 1210. The grooves 1210 may stay in water when the rechargeable battery 1200 contacts water. Therefore, the water-soluble ink 120 applied in the grooves 1210 is changed into a liquid state (dissolution or suspension) when the rechargeable battery 1200 contacts water and then drains out of the groove 1210 after the rechargeable battery 1200 moves, thereby showing whether there has been water contact. The groove 1210 may be formed in more than one groove in the cover case 730 so that it is easy to detect whether there has been water contact.

Figure 2H:
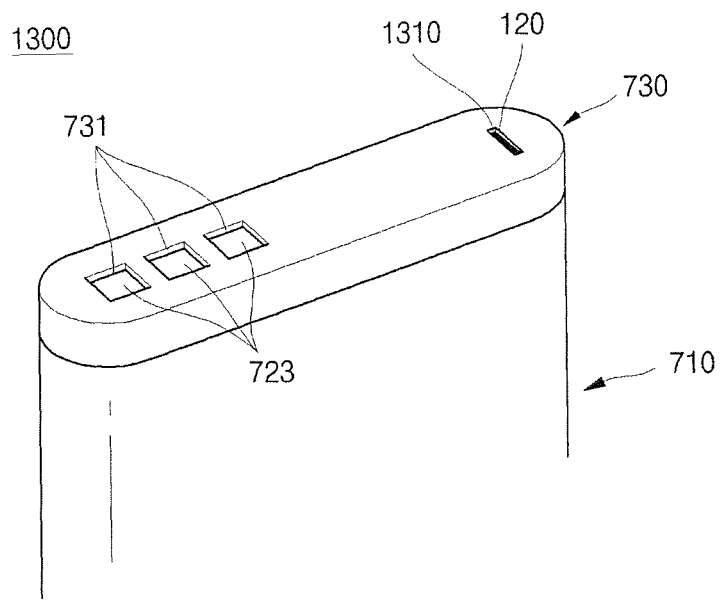
FIG. 2H is a partial perspective view illustrating a rechargeable battery having the function of detecting water contact according to still another embodiment of the present invention.

FIG. 2H is a partial perspective view illustrating a rechargeable battery 1300 having the function of detecting water contact according to still another embodiment of the present invention. A linear groove 1310 may be formed in a cover case 730 of the rechargeable battery 1300, the linear groove 1310 is formed in a linear shape and the water-soluble ink 120 is applied in the linear groove 1310, thereby detecting whether there has been water contact. The depth of the linear groove 1310 changes and the water-soluble ink 120 can be applied therein along the length and to all the depths. Therefore, the water-soluble ink 120 having the different depths can show how much the rechargeable battery 1300 contacts water by observing the change in the water-soluble ink 120 at the various depths when the rechargeable battery 1300 contacts water.

Figure 2I:
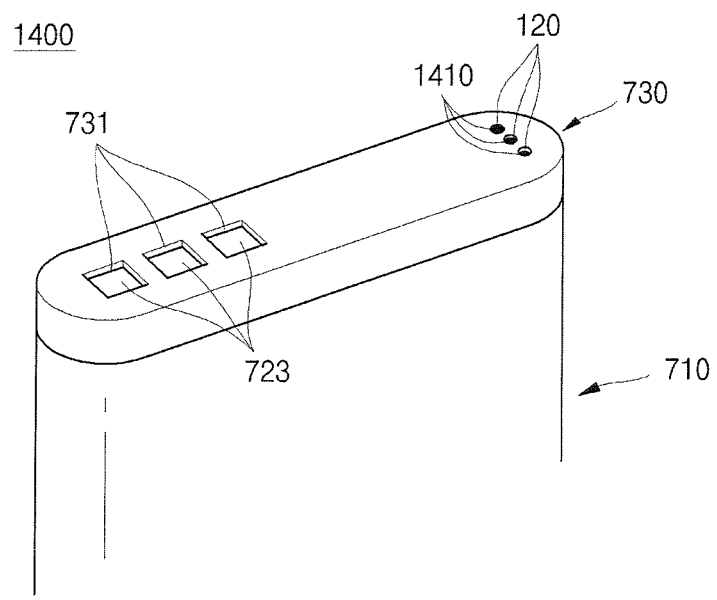
FIG. 2I is a partial perspective view illustrating a rechargeable battery having the function of detecting water contact according to still another embodiment of the present invention.

FIG. 2I is a partial perspective view illustrating a rechargeable battery 1400 having the function of detecting water contact according to still another embodiment of the present invention. A plurality of grooves 1410 may be formed in the cover case 730 of the rechargeable battery 1400, and at least one of the grooves 1410 is formed at a different depth. The water-soluble ink 120 may be applied in the plurality of grooves 1410, thereby showing whether and how much the rechargeable battery 1400 contacts water.

Figure 2J:
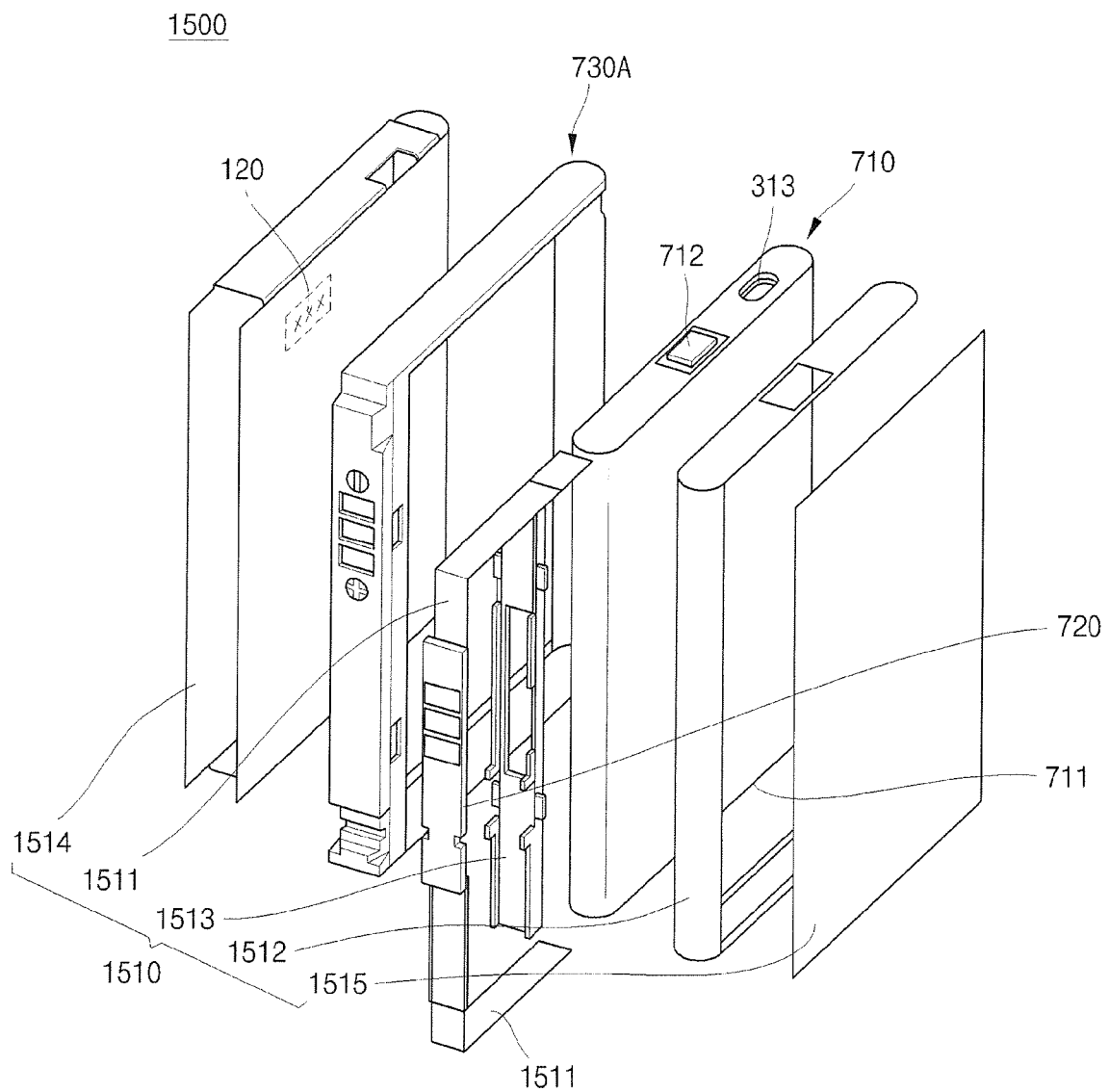
FIG. 2J is an exploded perspective view illustrating a rechargeable battery having the function of detecting water contact according to still another embodiment of the present invention.

FIG. 2J is an exploded perspective view illustrating a rechargeable battery 1500 having the function of detecting water contact according to still another embodiment of the present invention. The rechargeable battery 1500 may include battery 710, circuit board 720, cover case 730A and, combination auxiliaries 1510. In this case, water-soluble ink 120 may be applied on one or more of the combination auxiliaries 1510. In FIG. 2J, the cover case 730A is illustrated as a frame type, but the structure of the cover case 730A is not limited thereto.

The combination auxiliaries 1510 may include a lead tap 1511, an insulator 1512, a receiving case 1513, a label 1514, and a reinforcing plate 1515. The water-soluble ink 120 may be applied on at least one of the combination auxiliaries 1510. In FIG. 2J, the water-soluble ink 120 is applied on the label 1514.

In more detail, the lead tap 1511 electrically connects a positive electrode 711 and a negative electrode 712 of the battery 710 to the circuit board 720. The lead tap 1511 may be formed of nickel or a nickel alloy.

The insulator 1512 is disposed between the lead tap 1511 and the battery 710 to insulate the lead tap 1511, the positive electrode 711 and the negative electrode 712 of the battery 710. The insulator 1512 may be formed of paper or plastic.

The receiving case 1513 is formed between the battery 710 and the cover case 730A. The receiving case 1513 may be integrally combined with the cover case 730 where the circuit board 720 is received. The receiving case 1513 may be formed by injection molding.

The reinforcing plate 1515 is added on a wide surface of the battery 710 to protect the battery 710 from being scratched, struck or pierced. The reinforcing plate 1515 may be formed of injection molded plastic or a metal such as stainless steel. However, the present invention is not limited to the materials of the combination auxiliaries 1510.

In FIG. 2J, the label 1514 surrounds at least a part of the battery 710. An identification mark or the like is printed on the label 1514 in such a way that the label 1514 can both surround the battery 710 and be adhered to the cover case 730A. Although in FIG. 2J the water-soluble ink 120 is applied on the label 1514, the water-soluble ink 120 can be applied on at least one of the combination auxiliaries 1510, thereby showing whether the rechargeable battery 1500 contacts water.

Figure 3A:
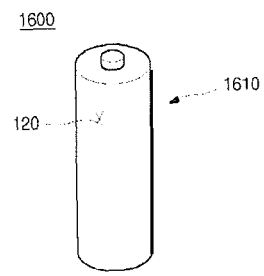
FIG. 3A is a perspective view illustrating a rechargeable battery having the function of detecting water contact according to another embodiment of the present invention.

FIG. 3A is a perspective view illustrating a rechargeable battery 1600 having the function of detecting water contact according to another embodiment of the present invention. The rechargeable battery 1600 may include a battery 1610 and water-soluble ink 120. The water-soluble ink 120 may be applied on a surface of the battery 1610, thereby showing whether the rechargeable battery 1600 contacts water.

Figure 3B:
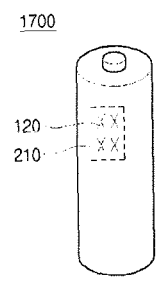
FIG. 3B is a perspective view illustrating a rechargeable battery having the function of detecting water contact according to another embodiment of the present invention.

FIG. 3B is a perspective view illustrating a rechargeable battery 1700 having the function of detecting water contact according to another embodiment of the present invention. Water-soluble ink 120 is applied on the rechargeable battery 1700 in a plurality of marks to form an area 210 for detecting water contact. Therefore, it is possible to visually and easily determine whether the rechargeable battery 1700 contacts water.

Figure 3C:
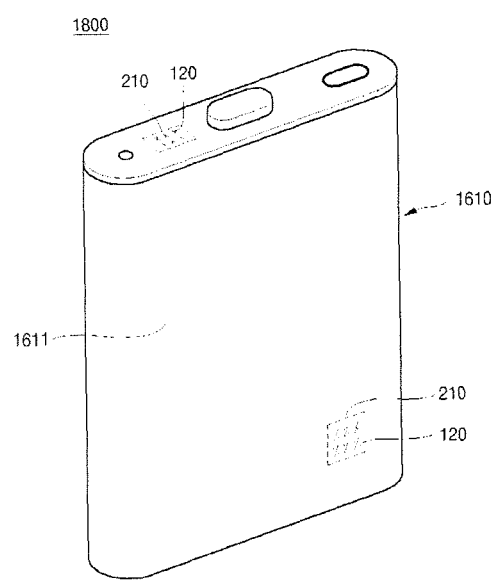
FIG. 3C is a perspective view illustrating a rechargeable battery having the function of detecting water contact according to another embodiment of the present invention.
Figure 3D:
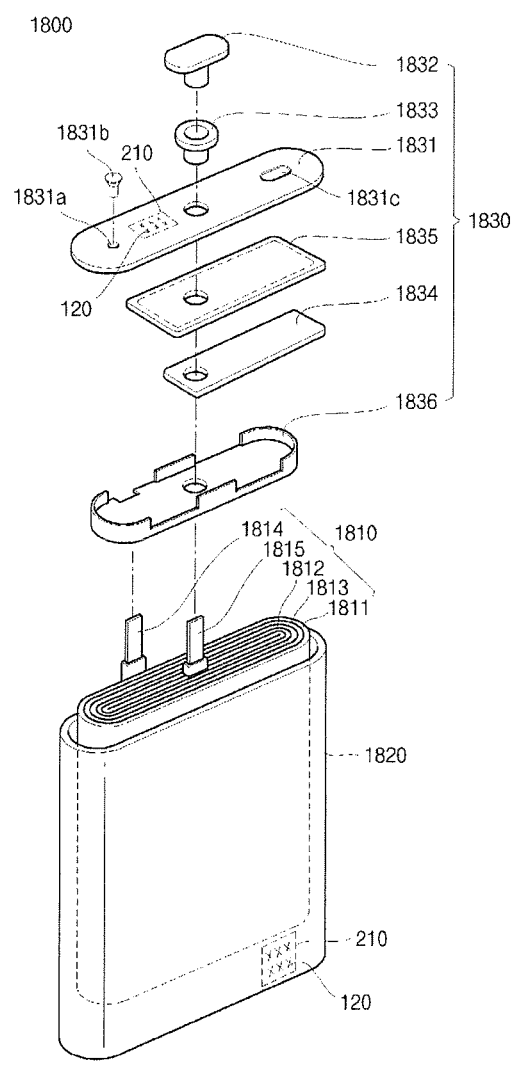
FIG. 3D is an exploded perspective view illustrating the rechargeable battery having the function of detecting water contact shown in FIG. 3C.

FIG. 3C is a perspective view illustrating a rechargeable battery 1800 having the function of detecting water contact according to another embodiment of the present invention. FIG. 3D is an exploded perspective view illustrating the rechargeable battery 1800 shown in FIG. 3C. Referring to FIGS. 3C and 3D, the rechargeable battery 1800 may include an electrode assembly 1810, a can 1820 containing the electrode assembly 1810, and a structure for completing electrical connection 1830 to positive and negative electrodes (described below) of the electrode assembly 1810, externally exposes the positive and negative electrodes (described below) within electrode assembly 1810, and closes the opening in the can 1820. Water-soluble ink 120 is applied on one of the can 1820 and the structure for completing electrical connection 1830, thereby showing whether the rechargeable battery 1800 contacts water. In more detail, the electrode assembly 1810 may be formed by laminating and spirally winding a positive electrode plate 1811, a negative electrode plate 1812, and a separator 1813.

The positive electrode plate 1811 may include a positive electrode collector (not shown) and a positive electrode active material (not shown). The positive electrode active material layer may include a layered compound containing lithium, a binder improving the binding force, and a conductive material improving conductivity. The positive electrode collector is generally formed of aluminum (Al), functions as a path for moving electrical charges occurring in the positive electrode active material layer and supports the positive electrode active material layer. The positive electrode active material layer is attached onto the wide surface of the positive electrode plate 1811. An uncoated portion (not shown) of the positive electrode plate 1911 (where the positive electrode active material layer is not formed) is formed in one side end of the positive electrode plate 1811. A positive electrode tap 1814 may be attached to the uncoated portion of the positive electrode plate 1811.

The negative electrode plate 1812 may include a negative electrode collector (not shown) and a negative electrode active material layer (not shown). The negative electrode active material layer may include carbon or graphite and a binder improving the binding force between particles of the negative active material layer. The negative electrode collector is generally formed of copper (Cu), functions as a path for moving electrical charges occurring in the negative electrode active material layer and supports the negative electrode active material layer. The negative electrode active material layer is attached onto the wide surface of the negative electrode plate 1812. An uncoated portion (not shown) of the negative electrode plate 1812 (where the negative electrode active material layer is not formed) is formed in one side end of the negative electrode plate 1812. A negative electrode tab 1815 may be attached to the uncoated portion of the negative electrode plate 1812.

The separator 1813 is disposed between the positive electrode plate 1811 and the negative electrode plate 1812 to insulate the positive electrode plate 1811 and the negative electrode plate 1812 and pass through charges from the positive electrode plate 1811 and the negative electrode plate 1812. The separator 1813 is generally formed of polyethylene (PE) or polypropylene (PP), but the present invention is not limited thereto.

The structure for completing the electrical connection 1830 may be electrically connected to the positive electrode and the negative electrode of the electrode assembly 1810 to externally expose the positive electrode and the negative electrode of the electrode assembly 1810, and close the opening in the can 1820. An example of the structure for finishing electrical connection 1830, includes a cap plate 1831, an electrode terminal 1832, an insulating gasket 1833, a terminal plate 1834, an insulating plate 1835, and an insulating case 1836. An electrolyte injection hole 1831a and a safety vent 1831c are formed on a top surface of the cap plate 1831. The cap plate 1831 is electrically connected to the positive electrode tab 1814 and closes the opening of the can 1820 through a welding method and the like. The electrolyte injection hole 1831a may be sealed by an electrolyte injection hole stopper 1831b. The electrode terminal 1832 is received in a central hole of the cap plate 1831 and is electrically connected to the negative electrode tab 1815. The insulating gasket 1833 covers the body portion of the electrode terminal 1832 to insulate the cap plate 1831 and the electrode terminal 1832. The insulating case 1836 includes holes or spaces providing for the positive electrode tab 1814 and the negative electrode tab 1815 to externally protrude. The insulating case 1836 is disposed on the top surface of the electrode assembly 1810 and insulates the top surface of the electrode assembly 1810. The terminal plate 1834 including a hole for pressing and fixing an end portion of the electrode terminal 1832 is combined with the end portion of the electrode terminal 1832. The insulating plate 1835 insulates the cap plate 1831 and the terminal plate 1834. The insulating gasket 1833 and the insulating case 1836 may be formed of an insulating material such as polypropylene resin or polyethylene resin. The cap plate 1831, the electrode terminal 1832 and the terminal plate 1834 may be formed of a conductive metal, such as aluminum or nickel, or a conductive metal alloy such as an alloy containing aluminum or nickel.

The area 210 for detecting water contact may be applied either on the outer portion of the can 1820 or the material for finishing electrical connection 1830 of the rechargeable battery 1800. A groove (not shown) having a very shallow depth may be formed in the can 1820 or the material for finishing electrical connection 1830. The water-soluble ink 120 may be applied in the groove. When the rechargeable battery 1800 contacts water, the area 210 for detecting water contact spreads or is removed, thereby detecting whether there has been water contact.

Figure 3E:
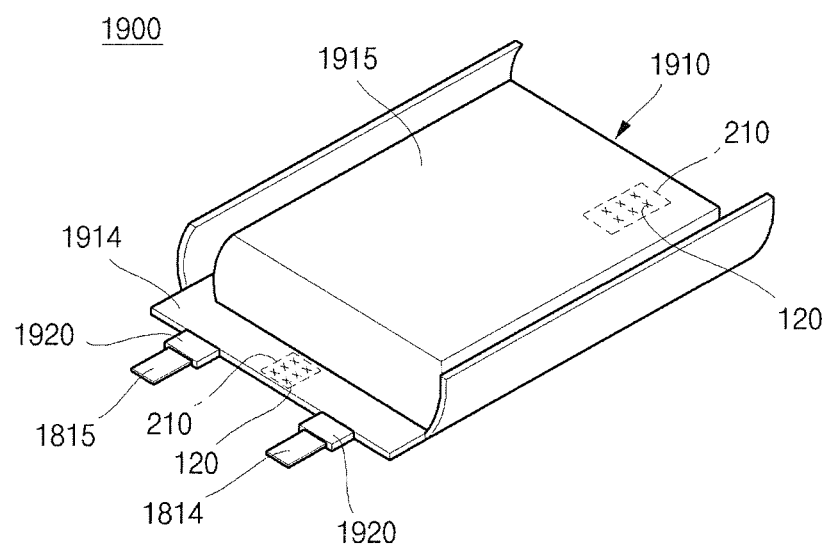
FIG. 3E is a perspective view illustrating a rechargeable battery having the function of detecting water contact according to another embodiment of the present invention.
Figure 3F:
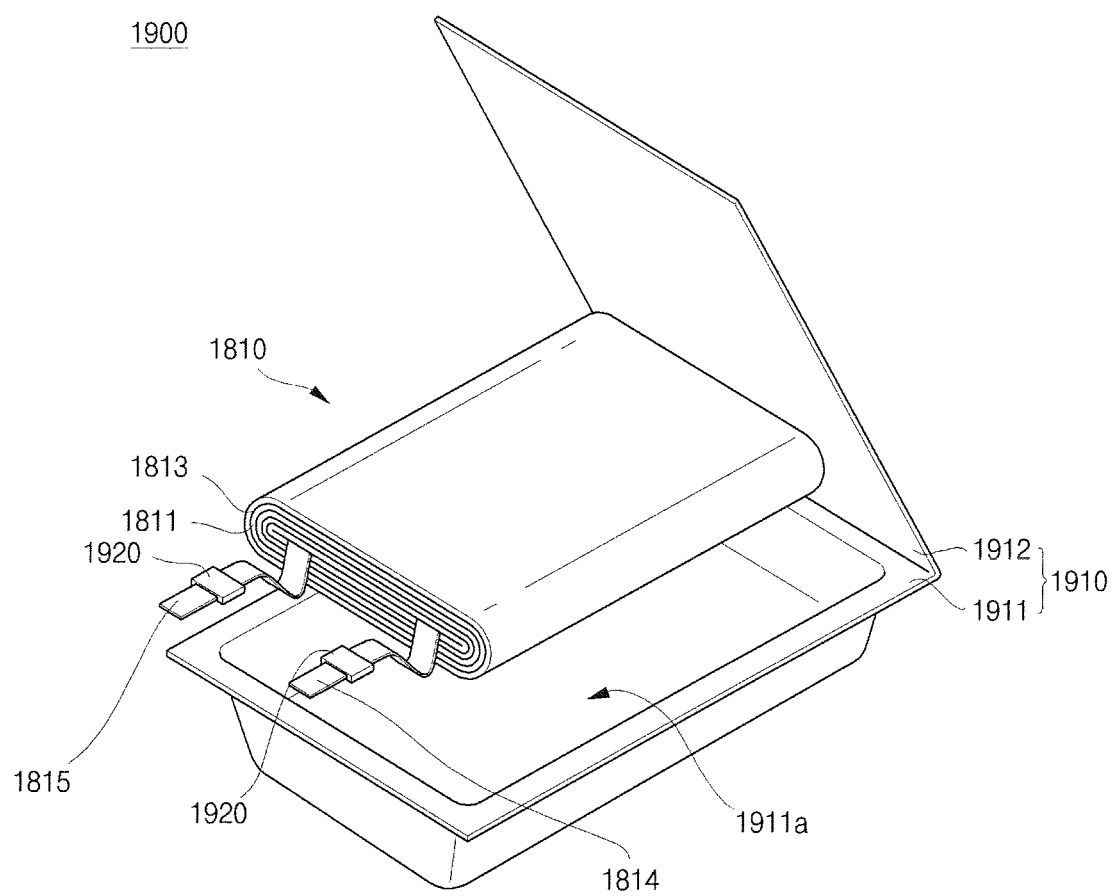
FIG. 3F is an exploded perspective view illustrating the rechargeable battery shown in FIG. 3E.

FIG. 3E is a perspective view illustrating a rechargeable battery 1900 having the function of detecting water contact according to another embodiment of the present invention. FIG. 3F is an exploded perspective view illustrating the rechargeable battery 1900 shown in FIG. 3E. Referring to FIGS. 3D, 3E and 3F, the rechargeable battery 1900 may include an electrode assembly 1810 and a pouch 1910 containing the electrode assembly 1810.

The electrode assembly 1810 may have the same configuration as the rechargeable battery 1800. The electrode assembly 1810 may include a separator 1813 containing polymer electrolyte.

The pouch 1910 contains the electrode assembly 1810 and externally exposes a positive electrode tab 1814 and a negative electrode tab 1815. The pouch 1910 may be formed as a multi layer film by laminating a plurality of layers. The multi layer film may be formed of an inner layer, for example, a heat bonding layer, formed of casted polypropylene (CPP), a middle barrier layer formed of aluminum, and an external protective layer formed of nylon. The pouch 1910 may include a lower film 1911 in which a receiving groove 1911a is formed to contain the electrode assembly 1810 and an upper film 1912 that closes the opening of the lower film 1911. The lower film 1911 and the upper film 1912 may be attached to each other by heating the layer where the lower film 1911 and the upper film 1912 contact each other. A positive/negative electrode insulating tape 1920 that is disposed between the lower film 1911 and the upper film 1912 may be thermally adhered to the pouch 1910. However, the present invention is not limited to the material of the pouch 1910 and the configuration thereof.

The water-soluble ink 120 may be applied on an outer portion of the pouch 1910 in area 210. As shown in FIG. 3E, the water-soluble ink 120 may be formed in a plurality of marks and may be applied on the outer surface of an area 1914 where the lower film 1911 and the upper film 1912 are thermally attached to each other, and may be applied on the wide surface 1915 of the pouch 1910. Accordingly, when the area 210 for detecting water contact formed on the pouch 1910 contacts water, it is possible to visually detect a change, such as spreading of the area 210 for detecting water contact, so that it is possible to immediately detect whether the pouch 1910 contacts water.

In the circuit board having the function of detecting water contact of according to an aspect of the present invention, water-soluble ink is applied on a substrate in advance, so that a label attaching process is skipped, making it possible to improve the production efficiency of the circuit board.

The battery pack having the function of detecting water contact according to an aspect of the present invention is formed by applying water-soluble ink thereon in advance, so that a label attaching process is skipped, making it possible to improve the production efficiency of the battery pack.

The rechargeable battery having the function of detecting water contact according to an aspect of the present invention is formed by applying water-soluble ink on an outer surface thereof in advance, so that a label attaching process is skipped, making it possible to improve the production efficiency of the rechargeable battery.

Aspects of the present invention include forming an area for detecting water contact using water-soluble ink on at least one of the circuit board, the cover case, and the battery, thereby leading to a prompt determination of which part of the circuit board, the cover case, or the battery contacts water.

The effects of these aspects of the present invention have been briefly described above to clearly demonstrate the essence of the invention, and the corresponding features of these aspects of the present invention have been described above in detail.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable battery, comprising:
    a circuit board comprising an insulating substrate, at least one printed circuit pattern and at least one protective circuit part electrically connected to the at least one printed circuit pattern, wherein the at least one printed circuit pattern is formed on the insulating substrate;
    a battery electrically coupled with the circuit board; and
    a cover case coupled to at least one of the circuit board and the battery,
    Wherein the circuit board includes two examination terminals, the examination terminals are electrically connected to the printed circuit pattern, have external access through a hole in the cover case, and are configured to determine whether the at least one protective circuit part is operational,
    wherein an area for detecting water contact is formed around the examination terminal on at least one of the insulating substrate, the at least one printed circuit pattern and the at least one protective circuit part, and
    Wherein said hole is configured to expose the examination terminals and the area for detecting water contact.

2. The rechargeable battery according to claim 1, wherein the area for detecting water contact is formed by applying a water-soluble ink around the examination terminal on the circuit board.

3. The rechargeable battery according to claim 1, wherein the area for detecting water contact is formed on the circuit board by applying water-soluble ink in a plurality of marks.

4. The rechargeable battery according to claim 1, wherein a paint is applied on a top surface of at least one of the insulating substrate, the at least one printed circuit pattern and the at least one protective circuit part, and the area for detecting water contact is formed around the examination terminal on a top surface of the paint and has a different color from that of the paint.

5. The rechargeable battery according to claim 1, wherein at least one hole is formed in the insulating substrate, and the area for detecting water contact is formed around the examination terminal by applying water-soluble ink around the examination terminal.

6. The rechargeable battery according to claim 1, wherein at least one groove is formed in the insulating substrate, and the area for detecting water contact is formed around the examination terminal by applying water-soluble ink in the groove.

* * * * *